United States Patent Office 3,215,541
Patented Nov. 2, 1965

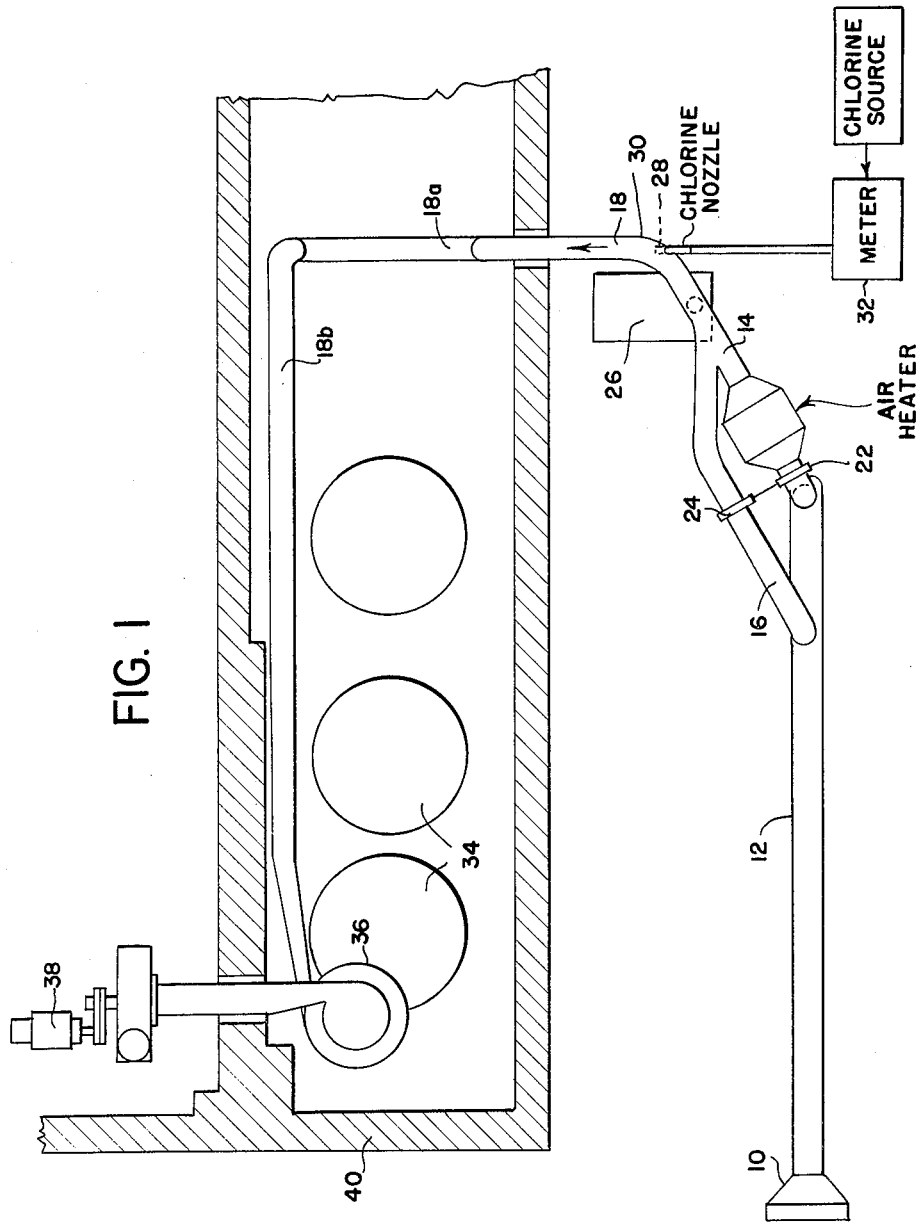

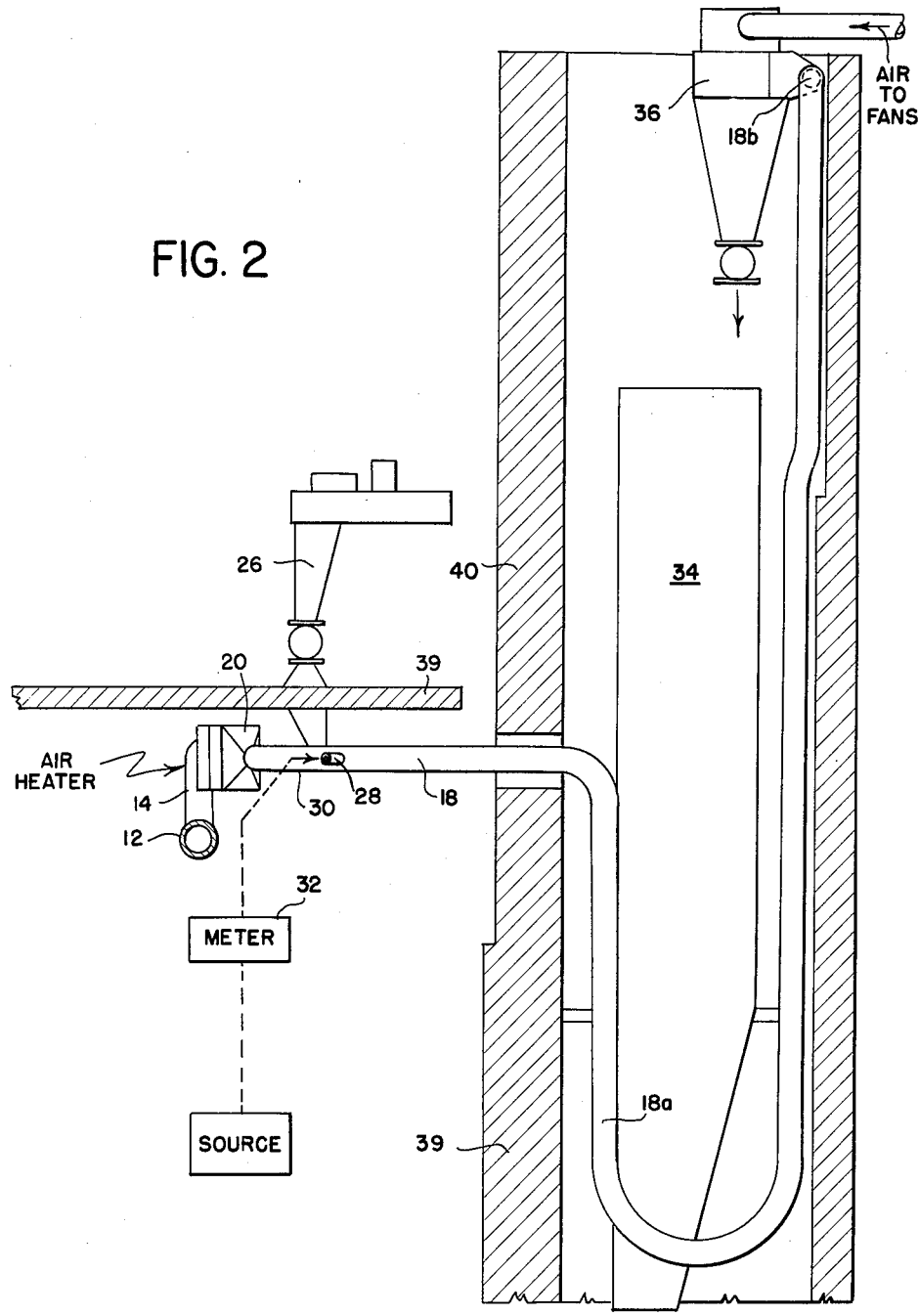

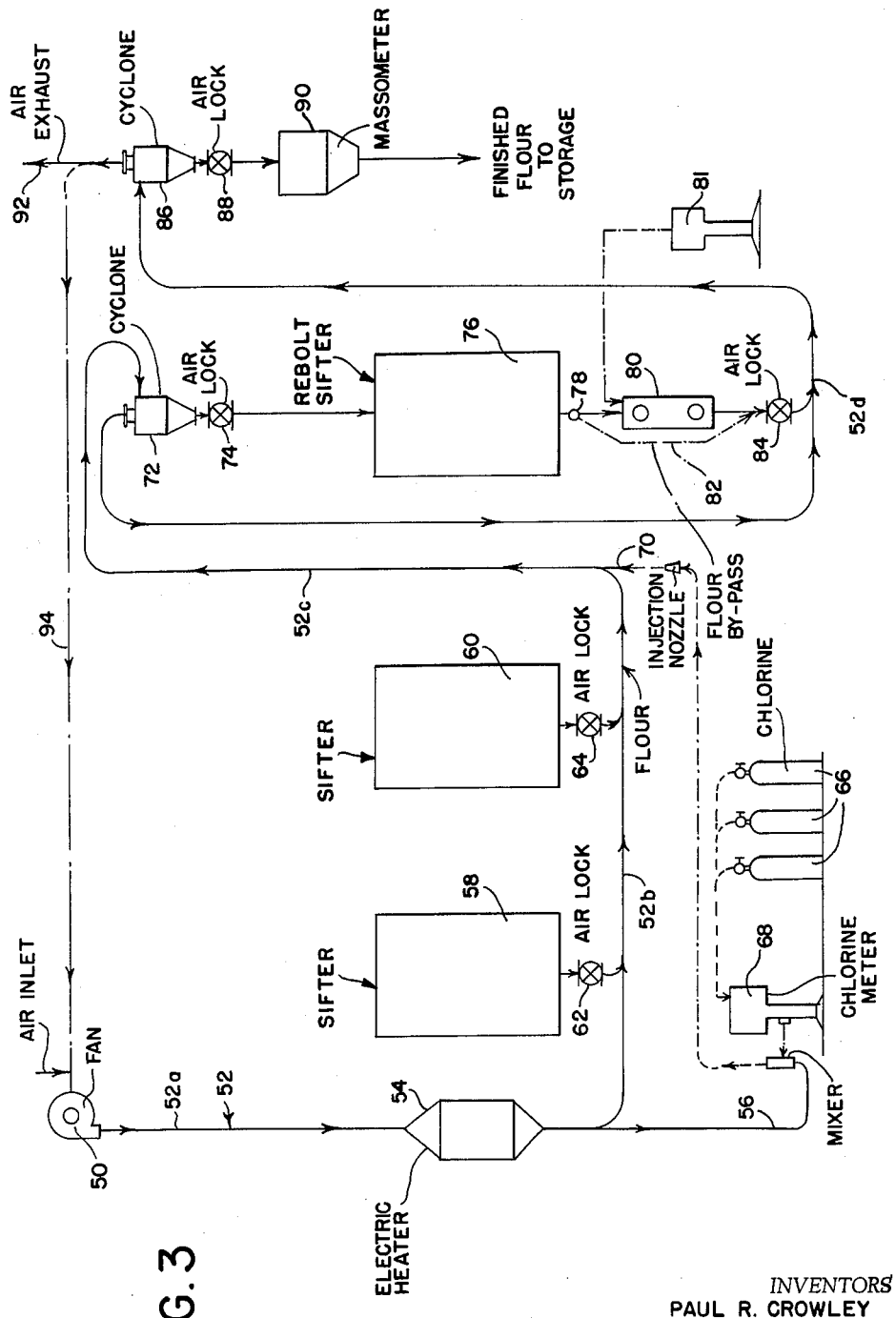

3,215,541
PNEUMATIC BLEACHING OF FLOUR WITH GASEOUS CHLORINE
Lester F. Borchardt and Paul R. Crowley, Minneapolis, Minn., assignors to General Mills, Inc., a corporation of Delaware
Filed Apr. 11, 1963, Ser. No. 272,379
5 Claims. (Cl. 99—232)

This invention relates generally to the flour manufacturing art, and more particularly to a process and apparatus especially directed to the improved bleaching of flour.

The usual method of commercially manufacturing flour is to pass grain such as wheat through a system of grinding rollers and sifters to obtain finely ground flour material. Depending upon the type or quality of flour which is desired as an end product, the sifted flour material may go through several subsequent processes, such as being bleached, matured or aged, dried, having certain ingredients added thereto, being resifted and ultimately being deposited in a suitable storage bin. These steps may be performed some in sequence and some simultaneously. When the flour is so treated in a plant on a large commercial scale, apparatus of considerable size is required, with the flour material being conveyed to the appropriate plant locations in proper sequence to be processed through the various pieces of equipment.

The bleaching process generally employed in the treatment of flour utilizes apparatus which brings the flour material into intimate contact with a suitable bleaching agent, such as chlorine gas. One of the more commonly used prior art devices by which this is accomplished is the log agitator. With this device, the sifted flour material is fed into a container, along with controlled amounts of a suitable bleaching agent. The flour is agitated and moved through the container by a number of paddles mounted within the container on a rotating shaft to expose the flour particles to the bleaching gas for the desired length of time. Another such prior art bleaching device comprises a tower having a zone of bleaching gas through which the flour material is dropped, with the material being deflected or dispersed, as by inclined surfaces which cause the flour material to cascade back and forth.

Although some of the prior art bleaching processes (such as that using the log agitator) have proven to be commercially practical, flour bleached by such commercial process is, for reasons not fully understood, generally not of as high quality as flour bleached under laboratory conditions. Hence efforts to improve on commercial flour manufacturing have been directed not only toward economy and efficiency of operation, but also to raising the quality of the end product.

It is believed that one of the factors adversely affecting the quality of commercially bleached flour is a lack of the desired uniformity in bleaching. That is to say, some of the flour is overexposed to the bleaching agent, while some is underexposed. As an extreme example of such overexposure, in the log agitator sometimes flour material will collect along the walls of the container for an undesirably long exposure time before finally being discharged. This overbleached flour is commonly referred to as "agitator dust," and if combined with the properly bleached flour, has a degrading effect. In addition, there are other factors not fully understood, but probably relating to the manner in which the flour is exposed to the bleaching agent, which also affect the quality of the flour.

In view of the problems of the prior art, it is an object of the present invention to provide an improved process and apparatus for the bleaching of flour, and especially to the bleaching of flour by a relatively fast reacting bleaching gas, such as chlorine, whereby the flour is bleached properly and with a relatively high degree of uniformity.

Further, the present invention purports to provide such a process and apparatus which may practically be used on a large commercial scale, with respect to such factors as economy in initial cost, upkeep, and maintenance of equipment, the amount of bleaching agent used per unit of flour, required operating space, ease of operation, etc. In this regard the present invention embodies the use of pneumatic conveying means in transporting the flour material as part of the overall manufacturing process, and introducing the bleaching agent into the flow path of the pneumatically conveyed flour material so that the flour material comes into intimate contact with the bleaching agent as the flour material is being so conveyed. In the preferred embodiment of the invention, chlorine gas is used as the bleaching agent.

It is yet another object to provide such a process and apparatus which enables the bleaching operation to be performed simultaneously with other steps of treating the flour, particularly the drying of the flour.

These and other objcts and features of the invention will be more readily understood and appreciated from the following detailed description of the preferred embodiments thereof selected for purposes of illustration and shown in the accompanying drawings, in which:

FIGURE 1 is a top plan view of a flour processing installation embodying preferred teachings of the present invention, FIGURE 2 is a sectional view taken on line 2—2 of FIGURE 1, FIGURE 3 is a schematic drawing of yet another such installation, wherein the apparatus is so arranged that flour stock may be bleached according to a common prior art method, or according to the teachings of the present invention.

In the accompanying drawings, FIGURES 1 and 2 illustrate flour processing apparatus especially suitable for a relatively large flour manufacturing operation. In this apparatus, outside air is drawn through a suitable filter 10 into a main conduit 12, from which air is fed through two branch lines 14 and 16 into the intake end of a secondary conduit 18. The branch line 14 is provided with an air heater, shown schematically at 20. By controlling the relative flow through lines 14 and 16 by means of respective valves 22 and 24, temperature of the air flowing into the secondary conduit 18 can easily be controlled. The valves 22 and 24 may be regulated manually or by a suitable thermostat (not shown).

Sifted flour stock is continuously fed at a controlled rate from a suitable prior art feed mechanism, shown schematically at 26, into the upstream end portion of the secondary conduit 18 to be immediately conveyed downstream in conduit 18. A short distance downstream of the point at which flour stock is fed into the line 18, chlorine gas is introduced therein, this being conveniently accomplished by means of a standard rubber hose 28 located at an elbow portion 30 of the line 18. In this particular layout, proper distribution of the chlorine into the line 18 can be accomplished by projecting the hose into the elbow 30 to a point where the end of the hose coincides with the center of the pneumatic conveying line 18. A suitable prior art chlorine metering device, such as is shown schematically at 32, is provided so that the chlorine gas may be introduced into line 18 at an accurately predetermined rate in accordance with the rate at which flour is fed into line 18.

In this particular arrangement of the apparatus, the conveying line 18 extends horizontally from the chlorine injection point at 30, then (for practical reasons relating to the plant layout) reaches downwardly to describe a vertical U-portion 18a and extends upwardly therefrom a substantial distance to a horizontal conveying line portion 18b, located above a plurality of storage bins 34. The flour stock in line 18b along with the conveying air stream traveling therein passes from line 18b into a cyclone separator 36. The flour is discharged from the separator 36 into one of the storage bins 34, while the conveying air is drawn from the cyclone 36 by a fan 38 and discharged into the atmosphere. This apparatus is desirably housed in a suitable building structure indicated at 40.

It is the fan 38 which supplies the motive force for the air traveling into line 12 and through line 18. This fan 38 should have a total capacity sufficient to create an air speed in line 18 high enough to cause the flour from the feed mechanism 26 to be conveyed in line 18 in a highly dispersed or agitated state. Air velocities in the order of 3,500 to 4,000 feet per minute have been found adequate to accomplish this, with flour being fed into line 18 at a mixing ratio of about 1.5 pounds of flour to 1 pound of air. The desired amount of chlorine for each unit of flour will vary according to the type of flour being processed, it being found that 0.5 to 0.9 ounce of chlorine per one hundred pounds of flour is generally sufficient to obtain proper bleaching of normal family grade flour. Higher concentrations of chlorine are required for a soft wheat cake flour. The flour travels from the chlorine injection point 30 through conveying line 18 to the separator 36 a distance slightly in excess of 100 feet. In this length of travel, with air flow of about 3,500 to 4,000 feet/min., it has been found that the exposure time of the flour to the chlorine is sufficient for the flour to react with about 99% or more of the chlorine injected into the conveying line 18. It is to be understood that higher linear velocities of air flow (e.g. 6,000 feet per minute) to convey the flour are also practical, but that with such higher air velocities, the distance which the flour is conveyed pneumatically in the presence of chlorine would be correspondingly increased to achieve the necessary exposure time of the flour to the chlorine.

Proper pneumatic conveying of particles of material depends upon various factors, such as particle size, density, configuration of the particles, etc., and the present state of the art of pneumatic conveying is developed sufficiently so that the practical limits, relating to such factors as air velocity, material to air ratio, etc., with respect to which proper conveying is achieved, can readily be established. It has been found that the operating conditions under which flour stock is properly conveyed pneumatically, provide an environment where the proper bleaching of flour can be accomplished. That is to say, when flour is introduced in the proper ratio into air traveling at a sufficiently higher linear velocity to highly agitate the flour and achieve proper pneumatic cnoveying action without flour collecting in or clogging the flow passage, the flour particles are so dispersed in the air stream that proper bleaching can be achieved, by introducing chlorine into the flow path at a proper rate and conveying the flour in the presence of the chlorine the proper distance.

By operating the air heater 20 and properly regulating the valves 22 and 24 in branch lines 14 and 16, the conveying air may be raised to a suitable temperature (generally about 250° F. or more) to accomplish proper drying of the flour traveling in line 18 simultaneously with the bleaching action. It is to be understood that the flour is gradually being dried throughout the treating thereof, simply by its exposure to the surrounding air. But it is common in the prior art that flour be subjected to a more intensive drying (as by exposing flour to air at a temperature of 250° F. to 350° F., but not at a temperature so great as to damage the flour), and it is this "intensive drying" that is being referred to herein by the term, "drying." As will be disclosed here inafter, it has been found that by combining the bleaching and "drying" action in the pneumatic conveying system, a somewhat higher grade flour is achieved. It is apparent that although only one bleaching and conveying unit (comprising components numbered 14 through 32) is shown herein, for a larger scale operation several more such units 14–32 could be similarly installed between pneumatic feed line 12 and the bins 34.

A second embodiment of the invention is illustrated schematically in FIG. 3. This embodiment is so arranged that for comparative purposes the flour stock may be bleached, as in the first embodiment, acocrding to the teachings of the present invention, or be bleached by the prior art method of using a log agitator.

In this second embodiment, air is circulated by a fan 50 through the initial portion 52a of a pneumatic conveying conduit generally designated 52. For clarity, in the course of this description the various portions of this main conduit 52 will be given subdesignations 52a, b, c, and d, according to the flow sequence in line 52. The air in the initial conduit portion 52a passes through an electric heater 54 and thence into the following main conduit portion 52b, with a portion of the air from 52a flowing into a by-pass line 56. Flour stock is fed into the conduit portion 52b from sifters 58 and 60 by means of respective feed mechanism 62 and 64. Chlorine is supplied from a set of tanks 66 through a conventional meter 68 into by-pass line 56, which leads back into portion 52c of the main conduit 52 at a point 70 downstream of the location at which flour stock is fed into conduit portion 52b.

The main pneumatic conveying line portion 52c carries the flour stock with the chlorine to a cyclone separator 72. The flour stock passes from the separator 72 through an air-lock 74 to a rebolt sitfer 76, while the air stream flows into the following main conduit portion 52d. Flour from the rebolt sifter 76 is directed by a suitable valve 78 either to a double log agitator 80 having a suitable chlorine source 81 or to a by-pass line 82. Both the double log agitator 80 and the by-pass line 82 leads through an air-lock 84 back into the main pneumatic conveying line portion 52d, which in turn leads to a second cyclone separator 86. Flour stock from separator 86 passes through air-lock 88 and massometer 90 to storage, while the conveying air is either passed out to the atmosphere, as at 92, or recirculated by way of line 94 back to the fan 50.

In the event that it is desired to recirculate the conveying air through the system, it is not possible to accomplish an intensive drying of the flour being conveyed, since after a period of recirculation, the conveying air would become saturated with moisture. However, by so recirculating the air in the system it becomes practical to use higher concentration of chlorine in the conveying air stream, since the chlorine which does not react with the flour will simply be recirculated in the system. With the higher concentration of chlorine, bleaching will proceed at a more rapid rate, with the result that a much shorter length of travel is required for the pneumatically conveyed flour to be properly bleached. When the bleaching process is initiated in a closed circuit system, chlorine is at first fed into this system at a relatively high art, until the concentration of chlorine builds up to a predetermined level. Thereafter, chlorine would be fed into the system at a lower rate to maintain the chlorine concentration at a desired level by replenishing the chlorrine which reacts with the flour.

It can readily be seen from the schematic showing of FIG. 3 that by regulating the heater 54, the bleaching may be accomplished either without drying or simultaneously with drying ("drying" being the "intensive drying" hereinbefore described). Also, by feeding chlorine from meter 68 into the main conveying line 52 at point 70 and manipulating the valve 78 to cause the flour to by-pass the log agitator 80, the flour stock is caused to be bleached according to the teachings of the present invention. On the other hand, by shutting off the chlorine from meter 68, and by means of valve 78 directing the flour stock through the double log agitator 80, the flour stock may be bleached by the prior art log agitator method (in which the flour is exposed in a conventional manner to chlorine supplied to the log agitator 80 from the meter indicated at 81). Thus, with this apparauts flour was able to be processed under four different conditions:

(1) In the pneumatic bleaching system with the heater off,

A—open circuit   B—closed circuit (2) In a pneumatic bleaching system with the heater on,
(3) In the double log agitator with the heater off, and
(4) In the double log agitator with the heater on.

Also samples from this same batch of flour were bleached under accurately controlled laboratory conditions. The quality of flour obtained by bleaching in the apparatus of FIG. 3 under these different conditions is indicated in the following results:

*Results of bleaching tests*

| | Descr. | $Cl_2$, oz./cwt. | Mois. | pH | Carotene | Bread | | | Cakes | | |
|---|---|---|---|---|---|---|---|---|---|---|---|
| | | | | | | Crumb-Color | Grain | Vol. | Crumb-Color | Grain | Vol. |
| 1 | Pneu.-C [1] | 0.7 | 13.4 | 5.50 | 0.75 | 10 | 9-TW | 2,600 | 10 | 10 | 1,195 |
| 2 | Pneu.-C | 0.9 | 13.8 | 5.47 | 0.73 | 10 | 10-TW | 2,550 | 12W | 10 | 1,220 |
| 3 | Pneu.-H [1] | 0.7 | 13.0 | 5.54 | 0.79 | 10 | 10 | 2,580 | 13W | 10 | 1,245 |
| 4 | Pneu.-H | 0.9 | 13.0 | 5.45 | 0.76 | 10 | 10 | 2,565 | 15W | 10 | 1,225 |
| 5 | Agit.-C | 0.7 | 14.0 | 5.57 | 1.00 | 8C | 10-TW | 2,610 | 9C | 10 | 1,225 |
| 6 | Agit.-C | 0.9 | 14.1 | 5.44 | 0.90 | 8C | 10-TW | 2,550 | 11W | 10 | 1,215 |
| 7 | Agit.-H | 0.7 | 13.0 | 5.53 | 0.99 | 8C | 10 | 2,595 | 7C | 8TW | 1,200 |
| 8 | Agit.-H | 0.9 | 13.0 | 5.43 | 0.96 | 8C | 10 | 2,535 | 12W | 10 | 1,250 |
| 9 | Lab | 0.7 | | 5.65 | 0.73 | 10 | 10 | 2,700 | 10 | 10 | 1,220 |
| 10 | Lab | 0.9 | | 5.62 | 0.69 | 10 | 10 | 2,660 | 11W | 10 | 1,230 |

[1] C=cold or not drying; H=hot or with drying.

The testing procedures used were generally the same as those commonly used in the flour milling industry, as described in an article by W. W. Prouty, entitled "Quality Evaluation of Baked Products," published in Baker's Digest (1962), volume 36, No. 2, page 71. The "Crumb Color" and "Grain" is judged on a scale with "10" being a desired norm, with increase of numerical value indicating an increase in quality. "W" indicates a color lighter than the norm, and "C" indicates a color darker than the norm. "TW" is an abbreviation for "thick wall," which is a condition departing from the desired norm.

Results of bleaching flour under these different conditions indicate that the quality of pneumatically bleached flour was superior to that bleached in the log agitator, and was equivalent to the laboratory bleached flour. Further the quality of flour simultaneously bleached and dried was found to be very good and in fact somewhat superior to cold pneumatically bleached flour. Also, although not shown in the above test results, it has been found that with the present invention somewhat less chlorine per unit of flour was required, as compared to the use of a log agitator.

To design a pneumatic conveying system on a commercial scale, the following empirical formula has been found to be applicable:

$$C = 100 - 45 e^{\frac{-.0273 LS}{VT}} \quad \text{for } LS/VT > 5$$

where:

C is a percent of chlorine reacted
L, length of conduit (ft.)
S, surface area of flour (ft.$^2$/lb.)
V, air velocity in conduit (ft./min.)
T, oz. chlorine introduced into conduit per 100 lb. flour.

In a pneumatic chlorination system of the open circuit type, the system length is determined by selecting a desired value for C, for example, 98% (corresponding to a 2% loss of chlorine), determining $LS/VT$ from the above equation, and then calculating length L based on flour surface area S, conveying velocity V, and chlorine treatment level T.

Since a closed circuit system can, within reasonable limits, be of any length, the above calculations are not necessary. The value of $LS/VT$ can however be used in calculating desired chlorine concentrations throughout the system with "T" being the chlorine introduced and recirculated into the conduit.

It is to be understood that the above empirical equation will vary somewhat from one system to another depending on the particular layout. However, it is believed that the above equation should be generally applicable to most commercial systems, and, therefore, useful for determining the practical limits within which proper bleaching is achieved in the present invention.

What is claimed:

1. In a flour manufacturing operation, where flour is moved to a location, a process comprising pneumatically conveying said flour in a highly agitated state at a predetermined rate of travel by means of air along a predetermined flow path, introducing gaseous chlorine into said flow path at a predetermined location thereat, which chlorine becomes mixed with said flour so that said chlorine is conveyed downstream along said flow path and comes into intimate contact with said flour, said chlorine being introduced at a concentration sufficient to achieve bleaching of said flour, and the air conveying said flour being at a temperature sufficiently high to subject said flour to intensive drying, so that said particles are dried by said air as the chlorine comes into intimate contact with the flour.

2. In a flour manufacturing operation, where flour is moved to a location, a process comprising pneumatically conveying said flour in a highly agitated state at a predetermined rate of travel by means of air along a predetermined flow path, introducing gaseous chlorine into said flow path at a predetermined location thereat, which chlorine becomes mixed with said flour so that said chlorine is conveyed downstream along said flow path and comes into intimate contact with said flour, said chlorine being introduced at a concentration sufficient to achieve bleaching of said flour, and the air conveying said flour is separated therefrom after said chlorine has become bleached, and is recirculated along said predetermined flow path, thereby recirculating with said air that portion of said chlorine which has not reacted with said flour.

3. The process as recited in claim 2, wherein chlorine is introduced into said flow path at a rate sufficient to keep the chlorine concentration at a desired level calculated according to a formula as follows:

$$C = 100 - 45 e^{\frac{-.0273 LS}{VT}} \quad \text{for } LS/VT > 5$$

wherein:

C is percent of chlorine reacted
L, length of travel (ft.) of flour particles in presence of chlorine
S, surface area of flour (ft.$^2$/lb.)
V, air velocity (ft./min.)
T, oz. chlorine introduced and recirculated into said flow path per 100 lb. flour.

4. In a flour manufacturing operation, where flour is moved to a location, a process comprising pneumatically conveying said flour in a highly agitated state at a predetermined rate of travel by means of air along a predetermined flow path, introducing gaseous chlorine into said flow path at a predetermined location thereat, which chlorine becomes mixed with said flour so that said chlorine is conveyed downstream along said flow path and comes into contact with said flour, said chlorine being introduced at a concentration sufficient to achieve bleaching of said flour, and said air conveying said flour is separated therefrom only after substantially all of the chlorine in the air has reacted with the flour, thus permitting said air to be discharged to outside atmosphere, the length which said flour is so conveyed in the presence of chlorine being at least equal to a length calculated by a formula as follows:

$$C = 100 - 45e^{\frac{-.0273LS}{VT}} \quad \text{for } LS/VT > 5$$

wherein:

C is the desired percentage of chlorine to be reacted with said flour
L, length of travel (ft.) of flour particles in presence of chlorine
S, surface area of flour (ft.$^2$/lb.)
V, air velocity (ft./min.)
T, oz. chlorine introduced into conduit per 100 lb flour.

5. In a flour manufacturing operation, where flour is moved to a location, a process comprising pneumatically conveying said flour in a highly agitated state at a predetermined rate of travel by means of air along a predetermined flow path, introducing gaseous chlorine into said flow path at a predetermined location thereat, which chlorine becomes mixed with said flour so that said chlorine is conveyed downstream along said flow path and comes into intimate contact with said flour, said chlorine being introduced at a concentration sufficient to achieve bleaching of said flour, and said air conveying said flour is separated therefrom only after substantially all of the chlorine in the air has reacted with the flour, thus permitting said air to be discharged to outside atmosphere, the length which the flour is so conveyed in the presence of chlorine being such in relation to the velocity of the conveying air, to the surface area of the flour per unit weight of flour, and to the amount of chlorine introduced per unit weight of flour, that substantially all of said chlorine reacts with said flour.

References Cited by the Examiner
UNITED STATES PATENTS

| | | | |
|---|---|---|---|
| 1,071,977 | 9/13 | Wesener | 99—232 |
| 1,250,072 | 12/17 | Alsop | 99—232 |
| 2,299,565 | 10/42 | Colburn | 222—194 X |
| 2,324,203 | 7/43 | Ferrari et al. | 99—232 |

A. LOUIS MONACELL, *Primary Examiner.*

RAYMOND N. JONES, *Examiner.*